United States Patent [19]

Haga

[11] Patent Number: 5,080,252

[45] Date of Patent: Jan. 14, 1992

[54] SEALING APPARATUS FOR SEALING MAGNETIC DEVICE

[75] Inventor: Yosuke Haga, Tokyo, Japan

[73] Assignee: TEAC Corporation, Japan

[21] Appl. No.: 641,524

[22] Filed: Jan. 15, 1991

[30] Foreign Application Priority Data

Jan. 16, 1990 [JP] Japan .................... 2-2568[U]

[51] Int. Cl.$^5$ .............................. B65D 53/00
[52] U.S. Cl. .................... 220/378; 360/132
[58] Field of Search ............ 220/578; 360/132, 133, 360/137

[56] References Cited

U.S. PATENT DOCUMENTS

| | | | |
|---|---|---|---|
| 3,547,298 | 12/1970 | Verslais | 220/578 X |
| 4,649,453 | 3/1987 | Iwasawa | 360/137 |
| 4,867,338 | 9/1989 | Bingham | 220/378 |
| 4,971,774 | 11/1990 | Schwanke et al. | 220/378 X |

Primary Examiner—Stephen Marcus
Assistant Examiner—Nova Stucker
Attorney, Agent, or Firm—Andrus, Sceales, Starke & Sawall

[57] ABSTRACT

A sealing apparatus for sealing a magnetic disk drive. The sealing apparatus includes a base member on which heat generating parts are mounted, a sealing member provided on and adhering to a circumferential edge of the base member, and a lid member secured to the base member via the sealing member for covering an internal space enclosed with the base member and the lid member. The lid member has a downwardly extending peripheral portion which comes in contact with the sealing member, and is arranged on the sealing member such that the downwardly extending peripheral portion is placed substantially on a centerline of the sealing member lying in the middle of a width of the circumferential edge of the base member. The sealing apparatus of the present invention can prevent the sealing member from deviating or separating from an original position on the base member when the base member is subject to thermal expansion due to heat generated from the heat generating parts mounted on the base member, and it is possible to stably maintain a sealing condition of the magnetic disk drive over a long period of time of practical use.

4 Claims, 2 Drawing Sheets

SEALING APPARATUS FOR SEALING MAGNETIC DEVICE

BACKGROUND OF THE INVENTION

The present invention generally relates to a sealing apparatus, and more particularly to a sealing apparatus for sealing a magnetic device such as a magnetic hard disk drive which has a base on which heat generating parts are mounted, a lid fitted onto the base and a sealing member between the base and the lid.

In a magnetic disk drive unit including a magnetic hard disk drive which uses a magnetic disk or hard disk as a data storage medium, a magnetic disk or hard disk within the magnetic disk drive and a driving mechanism of the magnetic disk drive unit is often damaged or any other operating problem takes place in the presence of dust, dirt or other foreign substances. Therefore, a sealing structure is required for preventing dust, dirt or other foreign substances from entering a driving mechanism inside the magnetic disk drive unit. FIG.1 shows an example of a conventional sealing apparatus which is provided for keeping the magnetic disk drive unit free from dust or foreign substances. In this conventional sealing apparatus shown in FIG. 1, a ring-like annular sealing member 2 is provided on an aluminum alloy base 1 made through aluminum die casting, and adheres to a circumferential edge 1a of the aluminum alloy base 1. Locating and adhering of this sealing member 2 on the aluminum alloy base 1 is made with a wall portion 1b which is elevated vertically from the circumferential edge 1a of the aluminum alloy base 1, as shown in FIG. 1. An aluminum alloy lid member 3 made through aluminum die casting has a downwardly extending peripheral portion 3a, and this peripheral portion 3a is placed in contact with the sealing member 2 and the lid member 3 is secured to the base 1 by a suitable fastener. The sealing member 2 is usually wider than a width of the peripheral portion 3a of the lid member 3. The external periphery of the lid member 3 at the peripheral edge 3a is substantially aligned with the external periphery of the sealing member 2 so that the sealing member 2 is pressed at its outermost periphery by the peripheral portion 3a of the lid member 3. In a case of the conventional sealing apparatus, the external periphery of the lid member 3 deviates from a centerline of the sealing member 2 which is located in the middle of a width of the sealing member 2, as shown in FIG. 1.

A disk drive motor (not shown in FIG. 1) for driving and rotating a magnetic disk within the magnetic disk drive and a head actuator (not shown in FIG. 1) for driving and swinging a head at a leading end of an arm in the magnetic disk drive are provided on the aluminum alloy base 1. During operation of the magnetic disk drive unit, the aluminum alloy base 1 is subject to heat owing to the running of the disk drive motor and the head actuator. Even if the base 1 and the lid member 3 are made of the same material with the same heat conductivity, heat from the moving parts such as the disk drive motor and the head actuator is conducted fast to the aluminum alloy base 1, but the heat is not transmitted directly to the lid member 3. The base 1 accordingly exhibits a relatively great thermal expansion when compared with that of the lid member 3. At the same time, an adhesive layer which is formed to join the sealing member 2 to the aluminum alloy base 1 gradually softens due to heat generated from the disk drive motor and the head actuator through the base 1, causing an undesired separation of the sealing member from the aluminum alloy base 1.

As described above, the sealing member 2 is pressed at its external periphery on the aluminum alloy base 1 by the lid member 3 and a differential thermal expansion is produced between the base 1 and the lid member 3 during operation of the magnetic disk drive unit. A slanting direction force F as indicated in FIG. 1 acts on the sealing member 2 so as to move the sealing member 2 toward the inside of the magnetic disk drive unit with respect to the aluminum alloy base 1. When the magnetic disk drive unit is in operation, the rates, the sealing member 2 is likely to deviate from the base 1 toward the inside of the magnetic disk drive unit. And, when the magnetic disk drive unit stops the operation, the adhesive layer of the sealing member 2 hardens due to a drop of temperature of the aluminum alloy base 1, thereby the sealing member 2 being moved to a position where the sealing member 2 deviates from the original position on the base 1. Therefore, in a case of the conventional sealing structure described above in which the magnetic disk drive is sealed, there is a problem in that the sealing member 2 is likely to deviate from the original position toward the inside of the magnetic disk drive unit little by little due to repetitious operations and stopping of the magnetic disk drive unit, so that the sealing member 2 is finally separate from the base 1, thus the sealing apparatus no longer having a sealing function to keep the magnetic disk drive unit free from dust or foreign matter.

SUMMARY OF THE INVENTION

Accordingly, it is a general object of the present invention to provide an improved sealing apparatus in which the above described problems are eliminated.

Another and more specific object of the present invention is to provide a sealing apparatus which comprises a base member on which heat generating parts are mounted, the base member being conductive to heat generated from the heat generating parts, a sealing member provided on and adhering to a circumferential edge of the base member, the sealing member having a ring-like annular shape in conformity with the circumferential edge of the base member, and a lid member fitted onto the sealing member for covering an internal space enclosed with the base member and the lid member, the lid member having at its periphery a downwardly extending peripheral portion which comes in contact with the sealing member, the lid member being arranged on the sealing member such that the downwardly extending peripheral portion is placed substantially on a centerline of the sealing member lying in the middle of a width of the circumferential edge of the base member. According to the present invention, it is possible to prevent the sealing member between the base member and the lid member from deviating or separating from the base member, when the base member thermally expands and deforms after repetitious operations and stopping of the magnetic disk drive unit to a greater degree than that in the lid member, due to heat from the heat generating parts on the base member. Therefore, the sealing apparatus can keep the inside of the magnetic disk drive unit free from dust or foreign substances stably over a long period of time of practical use.

Other objects and further features of the present invention will become apparent from the following de-

DESCRIPTION OF THE PREFERRED EMBODIMENT

Figure 2:
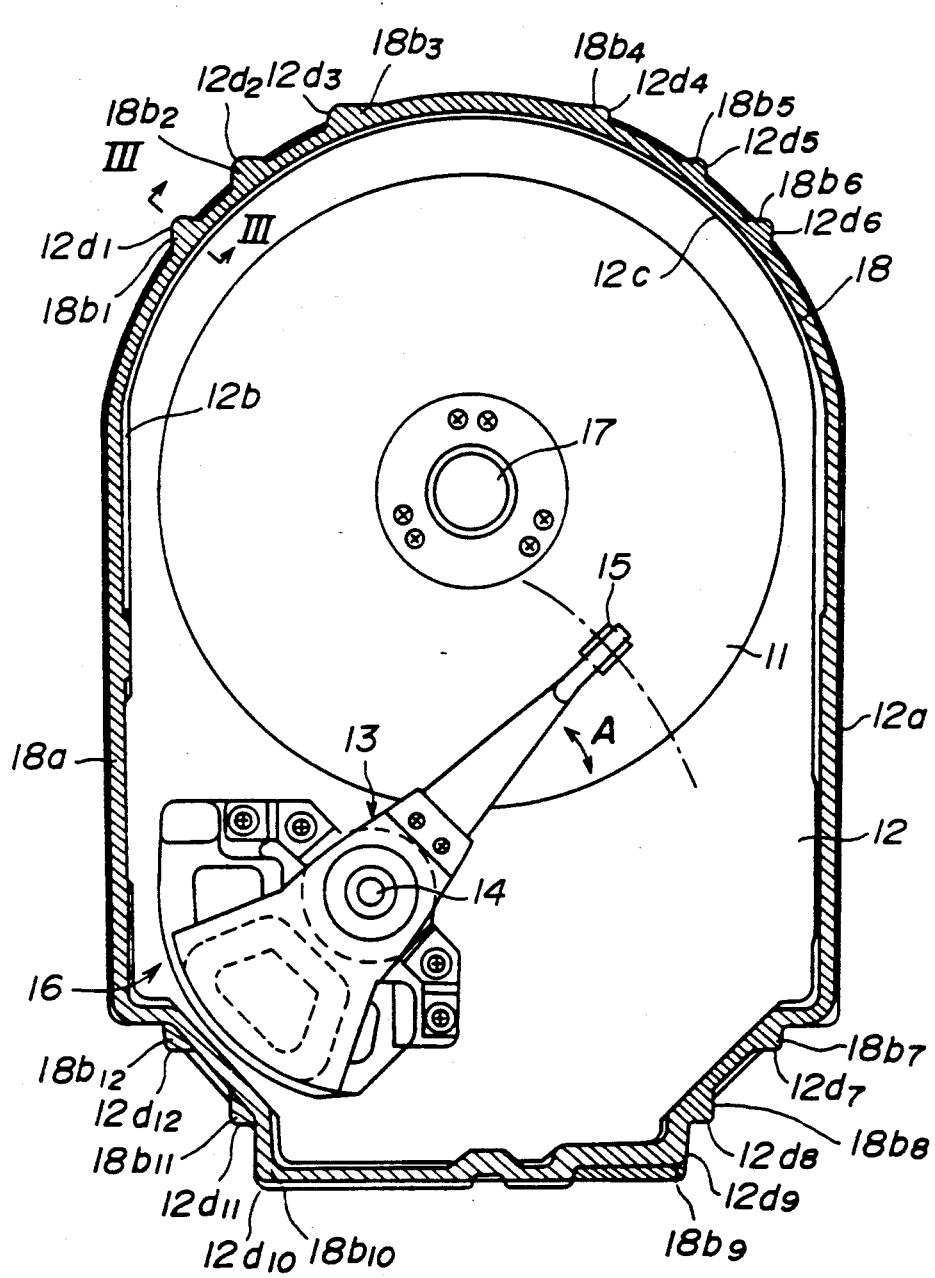
FIG. 2 is a plan view showing the construction of a magnetic disk drive unit to which an embodiment of a sealing apparatus according to the present invention may be applied.

First, a description will be given of an embodiment of a sealing apparatus for a magnetic disk drive according to the present invention, with reference to FIGS. 2 through 4. In this magnetic disk drive unit shown in FIG. 2, a magnetic disk 11 is rotated at a constant rotating speed by a motor 17 arranged under a base 12 made of aluminum alloy, and an arm 13 is rotatably supported at one end portion thereof on a shaft 14 of an actuator 16, the arm 13 having a head 15 at the other end portion thereof which is floated over the magnetic disk 11 and swings in a radial direction of the magnetic disk 11, as indicated by an arrow A in FIG. 2, when the arm 13 is rotated or swung around the shaft 14 by the actuator 16. In FIG. 2, a lid member 19, which is provided on the base 12 at its circumferential edge for covering the magnetic disk drive unit on the base 12, is removed for explaining clearly the construction of the magnetic disk drive unit.

On a circumferential edge 12a of the base 12, a ring-like annular sealing member 18 (indicated as a shaded area shown in FIG. 2) is provided, the ring-like annular sealing member 18 adhering to the circumferential edge 12a of the base 12. The base 12 is provided with vertically extending wall portions 12b and 12c which are located inside the circumferential edge 12a of the base 12 in the vicinity of the magnetic disk 11 so that the sealing member 18 does not come in contact with the magnetic disk 11 during operation. The base 12 is usually made of aluminum alloy through aluminum die casting, and the actuator 16 and the motor 17 are mounted on the base 12 for operating the head 15 of the arm 13 over the magnetic disk 11 and for driving the magnetic disk 11, respectively. The aluminum alloy base 12 which is heat conductive is subject to receive relatively great thermal influences due to heat being conveyed from the actuator 16 and the motor 17 when they are run during operation. Although thermal expansions of the components generally are produced uniformly within the magnetic disk drive unit in operation, a greater thermal influence may appear especially in a longitudinal direction of the components which are joined together when the components are made of different materials with different thermal conductivities. For this reason, the aluminum alloy base 12 is provided with a plurality of laterally extending triangular projections 12d at corner portions of the magnetic disk drive unit, and these corner portions are subject to relatively great thermal influences by the heat generating parts mounted on the base 12. The base 12 therefore comprises the circumferential edge 12a which has a relatively small width in the radial direction of the magnetic disk 11, and the plurality of laterally extending triangular projections 12d which are wider than the circumferential edge 12a. In accordance with this configuration of the base 12, the sealing member 18 is formed to have narrow portions 18a which adhere to the circumferential edge 12a of the base 12, and wide portions 18b that are wider than the narrow portions 18a in the radial direction of the magnetic disk 11, which wide portions 18b adhere to the laterally extending projections 12d of the base 12. In the embodiment shown in FIG. 2, the base 12 is provided with twelve laterally extending triangular projections $12d_1$ through $12d_{12}$ along the circumference of the base 12 at corner portions thereof only, and the sealing member 18 is provided with twelve wide portions $18b_1$ through $18b_2$ which are in conformity with the above laterally extending projections $12d_1$ through $12d_2$.

Figure 1:
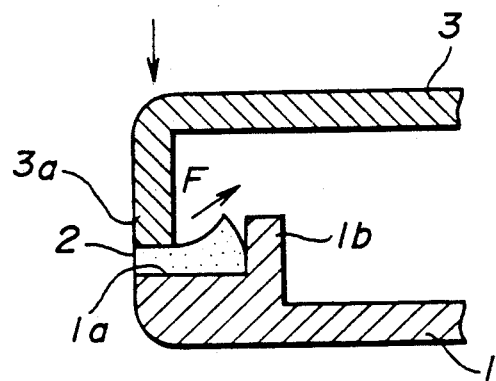
FIG. 1 is an enlarged sectional view for explaining the construction of a conventional sealing apparatus for a magnetic disk drive unit.
Figure 3:
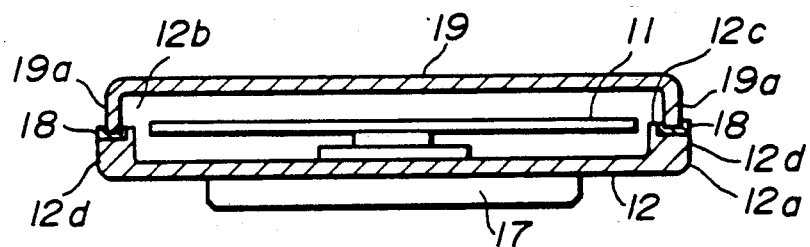
FIG. 3 is a sectional view of the magnetic disk drive unit shown in FIG. 2.
Figure 4:
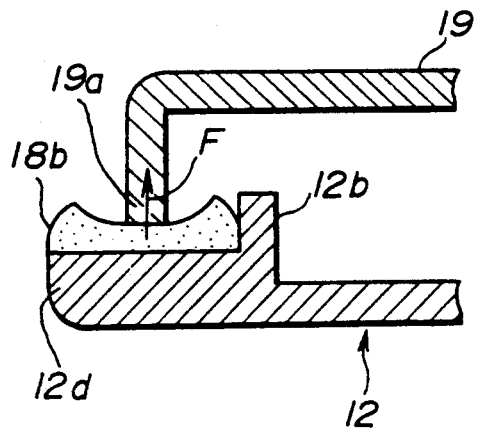
FIG. 4 is an enlarged sectional view showing the construction of an embodiment of a sealing apparatus according to the present invention.

As shown in FIG. 3, the lid member 19 is fitted onto the aluminum alloy base 12 for covering an internal space enclosed with the base 12 and the lid member 19. This lid member 19 has a downwardly extending peripheral portion 19a, and this peripheral portion 19a of the lid member 19 is placed in contact with the sealing member 18, so that the sealing member 18 is pressed substantially at its centerline by the peripheral portion 19a. However, the peripheral portion 19a of the lid member 19 in this embodiment is placed in contact with an outside surface of the sealing member 18 where the narrow portions 18 are located. But the peripheral portion 19a of the lid member 19 is placed substantially in the middle of a width of the wide portions 18b of the sealing member 18 where the laterally extending projections 12d are located in the base 12. Therefore, in the areas of the base 12 corresponding to the laterally extending projections 12d, the outer periphery of the lid member 19 substantially accords with the centerline of the wide portions 18b of the sealing member 18, as shown in FIG. 4.

In the above described sealing structure according to the present invention, the wide portions 18b of the sealing member 18, where the laterally extending projections 12d of the base 12 are provided and they are subject to relatively great thermal influences, are pressed in the middle thereof by the peripheral portion 19a of the lid member 19. Therefore, a pressure on the outer surface of the sealing member 18 and a pressure on the inner surface of the sealing member 18 are negated each other, and the resultant reaction from the sealing member 18 to the lid member 19 is an upwardly directed force F as shown in FIG. 4, and this force F acts on the peripheral portion 19a of the lid member 19. Therefore, it is possible for the sealing apparatus of the present invention to prevent an increase of the manufacturing cost of the base 12, because the base 12 can be formed to have the laterally extending projections 20d only partially along the circumference of the base 12. And, the existing lid member 19 may be used with no modifications for the sealing apparatus.

Figure 5:
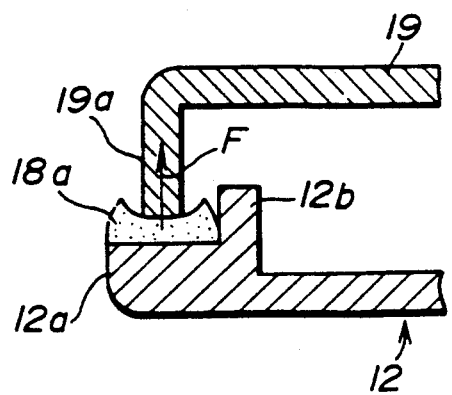
FIG. 5 is an enlarged sectional view showing the construction of another embodiment of a sealing apparatus according to the present invention.

FIG. 5 shows a modified example of the sealing apparatus according to the present invention. In this sealing apparatus shown in FIG. 5, the base 12 is provided only with a circumferential edge 12a having a constant width all along the periphery of the base 12. This base 12 is provided with no laterally extending projections 12d, and the sealing member 18 includes narrow portions 18a only. The downwardly extending peripheral edge 19a of the lid member 19 is placed in contact with the narrow portions 18a of the sealing member 18 substantially in the middle of the width thereof. For this purpose, the lid member 19 is formed to have the peripheral edge 19a which comes in contact with the intermediate portion of the sealing member 18. Also, in this case, it is possible to prevent the sealing member 18 from separating from the lid member 19, due to the thermal expansion of the base 12 as described above.

In the above embodiments, only the cases of magnetic disk drive units are described, but it is apparent from the foregoing description that the present invention may be applied to any device that includes a base on which heat generating parts are mounted, a lid member fitted onto the base and a sealing member provided between the base and the lid member for sealing the device.

Further, the present invention is not limited to the above described embodiments, and modifications and variations may be made without departing from the scope of the present invention.

What is claimed is:

1. A sealing apparatus comprising:
    a base member on which heat generating parts are mounted, the base member being conductive to heat generated from the heat generating parts;
    sealing means provided on and adhering to a circumferential edge of the base member, the sealing means having a ring-like annular shape in conformity with the circumferential edge of the base member; and
    a lid member fitted onto the sealing means for covering an internal space enclosed with the base member and the lid member, the lid member having at its periphery a downwardly extending peripheral portion which comes in contact with the sealing means,
    the lid member being arranged on the sealing means such that the downwardly extending peripheral portion is placed substantially on a center line of the sealing means lying in the middle of a width of the circumferential edge of the base member,
    wherein a plurality of laterally extending projections are provided on the circumferential edge of the base member, the sealing means having narrow portions and wide portions, the narrow portions adhering to the base member at the circumferential edge thereof where no projections are provided, the wide portions adhering to portions of the base member where the plurality of laterally extending projections are located.

2. The apparatus as claimed in claim 1, wherein said peripheral portion of the lid member is placed on an outside surface of the narrow portions of the sealing means, the lid member being arranged on the sealing member such that such peripheral portion is placed substantially on a centerline of the wide portions of the sealing means lying in the middle of a width of the circumferential edge of the base member.

3. The apparatus as claimed in claim 1, wherein said plurality of laterally extending projections are provided only at four corners of the base member along the circumference thereof, the four corners being subject to relatively great thermal influences due to heat from the heat generating parts.

4. The apparatus as claimed in claim 2, wherein the downwardly extending peripheral portion of the lid member is formed in conformity with the circumferential edge of the base member and in conformity with the narrow portions of the sealing member and the wide portions thereof.

* * * * *